May 28, 1968   W. G. REDMOND, JR   3,386,022
CONTROL CIRCUIT FOR MOVING CLOSURES TO CLOSED POSITION
UPON THE OCCURRENCE OF PRECIPITATION
Filed Feb. 27, 1967                                    4 Sheets-Sheet 1

INVENTOR
William G. Redmond, Jr.

BY
ATTORNEYS

INVENTOR
William G. Redmond, Jr.

ATTORNEYS

United States Patent Office 3,386,022
Patented May 28, 1968

3,386,022
CONTROL CIRCUIT FOR MOVING CLOSURES TO CLOSED POSITION UPON THE OCCURRENCE OF PRECIPITATION
William G. Redmond, Jr., 4236 Bobbitt Drive, Dallas, Tex. 75229
Continuation-in-part of application Ser. No. 307,548, Sept. 9, 1963. This application Feb. 27, 1967, Ser. No. 618,811
27 Claims. (Cl. 318—483)

ABSTRACT OF THE DISCLOSURE

A control circuit having a sensing means for sensing the occurrence of precipitation and energizing the drive means of closures, such as windows or tops of automobiles, ar windows, doors or vents of buildings, to cause any such closures in open position to be moved to their closed positions.

---

This application is a continuation-in-part application of my copending application Ser. No. 307,548, filed Sept. 9, 1963, on which Patent No. 3,307,095 was issued on Feb. 28, 1967.

This invention relates to a control circuit and more particularly to control circuits for operating drive means of closures to move the closures to closed position upon the occurrence of precipitation.

An object of this invention is to provide a new and improved control circuit for automatically moving closures of buildings, automobiles, and the like, such as windows and the top of convertible automobiles to closed position upon occurrence of precipitation.

Another object is to provide a control circuit for automatically closing any open closure having a sensing circuit including a precipitation sensor for sensing the occurrence of precipitation and initiating operation of a control means which in turn causes a switch means to connect the drive means of the closure across an input circuit.

Still another object is to provide a control circuit of the type described which has timer means operatively associated with the control means for de-energizing the control circuit a predetermined period of time after the initiation of operation of the control means sufficiently long to enable the drive means to move the closure from its fully open to its fully closed position.

A further object is to provide a control circuit of the type described for causing sequential energization of the drive means of different closures, such as the top and the windows of a convertible automobile, upon the occurrence of precipitation.

A still further object is to provide a control circuit of the type described wherein the switch means may comprise a relay, power transistors and the like and the control means may comprise a semi-conductive device such as a silicon controlled rectifier.

Another object is to provide a new and improved control circuit for automatically energizing the drive means of the top and the windows of a convertible automobile to move the top and the windows to their closed positions upon the occurrence of precipitation which has means for preventing operation of the drive means of the top and of the windows when the ignition switch of the automobile is in closed position in order to prevent damage to automobiles which could occur if the top were raised while the vehicle is traveling at a high speed.

Still another object is to provide a control circuit of the type described having means for sequently causing energization of the drive means of the top and windows to cause the top to be moved to its fully closed position and then cause energization of the drive means of the windows of the convertible automobile to raise the windows to their closed positions.

Additional objects and advantages of the invention will be readily apparent from the reading of the following description of a device constructed in accordance with the invention, and reference to the accompanying drawings thereof, wherein:

FIGURE 5 is a view of still another control circuit for sequentially moving the top and the windows of an automobile to their closed positions; and, FIGURE 6 is a view of still another control circuit for closing the windows of an automobile employing power transistors as the switching means for connecting the drive means of the windows across an input circuit; and, FIGURE 7 is a diagrammatic illustration of a modified portion of the control circuit illustrated in FIGURE 2.

Figure 1:
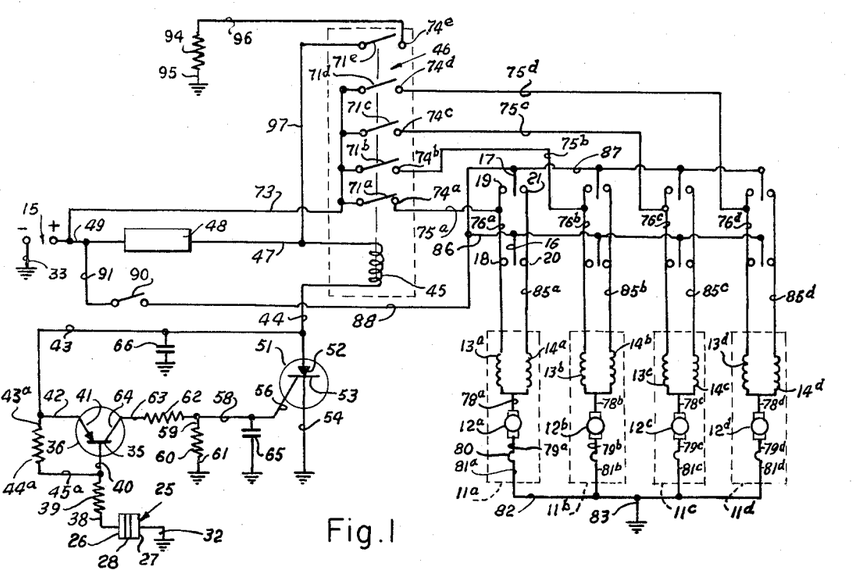
FIGURE 1 is a diagrammatic illustration of a control circuit for moving the windows of an automobile to closed positions upon the occurrence of precipitation.

Referring now particularly to FIGURE 1 of the drawings the control circuit 10 embodying the invention is used to raise the windows of an automobile which are movable between their closed and open positions by usual window motors 11a, 11b, 11c and 11d. Each of the motors may be of the direct current series type having an armature 12 and a pair of field or stator windings 13 and 14. The field windings of each window motor are selectively connectable in series with the armature winding across a direct current input circuit 15 by means of a switch 16 located adjacent a window and also by a switch 17 located at the dashboard or other suitable location adjacent the driver seat as will be explained in greater detail below. Each window is moved from its open position to its closed position whenever its associated switch 16 or 17 is moved to the left to engage the stationary contact 18 or 19, respectively, to cause the motor drive shaft to rotate in one direction and is moved from its open position to its closed position whenever either its associated switch 16 or 17 is moved to the left to engage the stationary contact 20 or 21, respectively, to cause the motor drive shaft to rotate in the opposite direction. The drive shafts of the motors are of course connected to the windows by suitable linkage means. Each of the window motors also usually includes an automatically reset overload release device or circuit breaker 80 connected in series with the armature winding which opens to disconnect the motor from the input circuit upon the occurrence of an overload on the motor and then recloses automatically after a predetermined period of time.

The control circuit includes a precipitation sensor 25 securable to the automobile at any suitable exposed location thereof. The sensor device may be of the type fully described and illustrated in my copending application Ser. No. 307,548 of Sept. 9, 1963, and on which Patent No. 3,307,095 was issued on Feb. 28, 1967. The sensor includes a pair of conductive strips 26 and 27 which are separated by an insulation strip 28 so that when moisture falls on the upwardly facing edges of the strips, the moisture provides an electrical path or circuit between the conductive strips. One of the conductive strips 27 is connected to one side of the input circuit 15 by a conductor 32, ground and a conductor 33 while the other strip 26 is connected to the base 35 of a transistor 36 through a conductor 38, a resistance 39, and a conductor 40. The emitter 41 of the transistor is connected to the common connection of the base and the resistance 39 by the conductors 42 and 43a, a resistance 44a and a conductor 45a, and to the positive side of the input circuit 15 through the conductors 42, and 44, the winding 45 of a relay 46, a conductor 47, a timer switch 48 and a conductor 49. The timer switch 48 may be of any suitable type, such as type of switch commercially available from Wood Electric Corporation as Model No. 374, which opens a predetermined period of time after it is connected across the input circuit and then remains open until it is manually reset. The period of time during which the switch 48 remains closed is determined by the value of the current flowing therethrough, the higher the current the shorter will be the period of time in which it remains closed after its connection across the input circuit.

The timer switch 48 is connectable across the input circuit by a silicon controlled rectifier 51 through the conductors 49 and 47, the relay winding 45, the conductor 44, the anode 52-cathode 53 circuit of the rectifier 51, the conductor 54, ground and the conductor 33. The gate 56 of the rectifier, when the sensor 25 is non-conductive, is at ground potential since the gate is connected to ground through the conductors 58 and 59, a resistance 60, and the conductor 61. The potential of the gate is raised when the sensor 25 becomes conductive, i.e., when its resistance decreases, since the gate is connected through the conductor 58, a resistance 62 and the conductor 63 to the collector 64 of the transistor 36

It will be apparent that when the sensor is non-conductive, the base and the emitter of the transistor are at substantially the positive voltage of the input circuit and the emitter-collector circuit thereof is therefore non-conductive. When the sensor becomes conductive, i.e., when its resistance decreases, the base 35 goes negative relative to the emitter 41 and the collector-emitter circuit of the transistor 36 is rendered conductive, and a positive voltage is applied to the gate. The anode-cathode circuit of the rectifier will thus be rendered conductive and will then remain conductive until its anode is disconnected from the source of positive voltage which will occur when the switch 48 opens. A capacitor 65 is connected between ground and the gate 56 and a capacitor 66 is connected between ground and the anode 52 to prevent extraneous electromagnetic interference from accidentally rendering the rectifier conductive.

When the relay winding 45 is energizing, it moves its contacts 71a, 71b, 71c and 71d to their closed positions. The movable relay contacts are connected to the positive side of the input circuit through the conductors 49 and 73 while their associated stationary contacts 74a, 74b, 74c and 74d are connected by the conductors 75a, 75b, 75c and 75d to the conductors 76a, 76b, 76c and 76d, respectively, which are connected to one side of the windings 13a, 13b, 13c and 14d, respectively, of the four motors. It will thus be apparent that when the relay winding 45 is energized and the relay contacts are moved to their closed positions, the windings 13 of the motors are connected to the positive side of the input circuit 15 through the relay contacts and to the other side of the input circuit through the conductors 78a, 78b, 78c and 78d, their armatures, the conductors 79a, 79b, 79c, 79d, their circuit breakers 80, the conductors 81a, 81b, 81c and 81d, the conductors 82 and 83, ground and the conductor 33.

The stationary contacts 18 and 19 of the manually operable switches 16 and 17 of each motor are also connected to their associated conductor 76 while their other stationary contacts 20 and 21 are connected to a conductor 85 which is connected to one side of the other winding 14 of each motor. The switches 16 of the motors are connected to a conductor 86 and the switches 17 are connected to the conductor 87 which in turn are connected to the positive side of the input circuit through a conductor 88, the ignition switch 90, and the conductors 91 and 49.

It will thus be apparent that when either switch 16 or 17 is moved to the left to engage its contact 20 or 21, current will flow through the winding 14 of such motor to cause its window to move to its open position and if it is moved to the right to engage its contact 18 or 19, current will flow through the stator winding 13 of the motor to cause the window operated thereby to move to its closed position.

In use, when the automobile is left unattended, the ignition switch 90 is open and the timer switch 48 is closed. Assuming now that the automobile windows have been left open, the emitter-collector circuit of the transistor 36 is non-conductive since its base and its emitter are at the potential of the positive side of the input circuit since the sensor 25 is now non-conductive. The rectifier 51 is also non-conductive. If a drop of rain now falls on the top edge of the sensor and across the non-conductive middle strip 28 to establish conduction through the sensor, the voltage of the base 35 of the transistor 36 decreases and the transistor emitter-collector circuit is rendered conductive. As a result, a positive potential is applied to the gate 56 and the rectifier is rendered conductive. Once the rectifier is rendered conductive, the relay winding 45 is energized causing its contacts 71 to move to their closed positions and the motors 11 will now move any window which was left in its open position back to its closed position.

The timer switch 48 will remain open for a period of time long enough for any one of the windows to be moved from its fully open to its fully closed position. After such period of time, the switch 48 will open disconnecting the emitter of the transistor and the anode of the rectifier from the positive side of the input circuit and rendering both the transistor and the rectifier non-conductive. The relay winding is thus de-energized and its contacts move to their open positions disconnecting the motors from the input circuit. It will be apparent that since the rectifier will remain conductive until its anode is disconnected from the positive side of the input circuit, any open window will be moved to its closed position even if the moisture on the upper edge of the sensor evaporates in a period of time shorter than that necessary to move the window from its fully open to its fully closed position. The windows will be moved to their fully closed position whenever even a small trace of precipitation falls upon the sensor and will not operate intermittently even if the rain drops fall intermittently upon the upper edge of the sensor and evaporate before the windows can move to their fully closed positions. Such fast evaporation of the moisture on the sensor may occur if the ambient temperature is quite high, or if the sensor is in a position where it has been exposed to the sunlight and is hot, and the drops of rain are widely scattered as usually occurs upon the beginning of a rain.

The operation of the control circuit 10 is substantially independent on the gain of the transistor 36 since its base current flow required to render it conductive is quite low compared to the current flow through the resistance 44a.

It will also be apparent that since the only current flowing through the switch 48 is that flowing through the relay winding 45, a switch having a relatively low current rating may be employed since it does not have to conduct the load currents of the motors.

Should one or more of the windows be in their fully closed positions when the rain begins to fall, the load current through its stalled motor will be great and its protective circuit breaker 80 may open during the period of time that the relay winding 45 is energized but this will not affect the operation of the timer switch 48 since only the current flowing through the relay winding 45 flows therethrough. The control circuit, once the windows have been closed and the switch 48 is open, is completely inoperative and no current flows therethrough, both the transistor and rectifier circuits now being disconnected from the positive side of the input circuit, and the circuit can be rendered operative again only by the manual closing of the switch 48.

It will be apparent to those skilled in the art that the resistance 60 prevents any small leakage currents through the collector-emitter circuit of the transistor 36 from triggering the rectifier, that the resistance 62 limits current flow in the collector-emitter circuit and thus protects the transistor and the rectifier against excessive current flow due to transient voltages, that the capacitors 65 and 66 prevent electromagnetic interference or transients from accidentally rendering the rectifier conductive, and that the resistance 39 prevents excessive base current in the transistor 36 in the event that a direct short occurs across the conductive strips of the sensor 25.

If the current flow through the rectifier and the relay winding is relatively low and it is impossible or economically impractical to employ a timer switch 48 which operates properly under such low current values, the relay 46 may be provided with an additional contact 71e which when the relay winding is energized connects a resistance 94 in series with the timer switch 48, and in parallel with the relay winding and the rectifier across the input circuit, one side of the resistance being connected through the conductor 95, ground and the conduit 33 to one side of the input circuit and its other side being connected to the other side of the other input circuit through the conductor 96, the relay contact 71e, the conductors 97 and 47, the timer switch 48 and the conductor 49.

It will thus be apparent that by providing a resistance 94 of appropriate value, the timer switch will be caused to have a desired current flow therethrough to cause it to open after a predetermined period of time. If desired, a resistance could be connected across the relay winding for this purpose, but this would result in increased current load to the rectifier.

Figure 2:
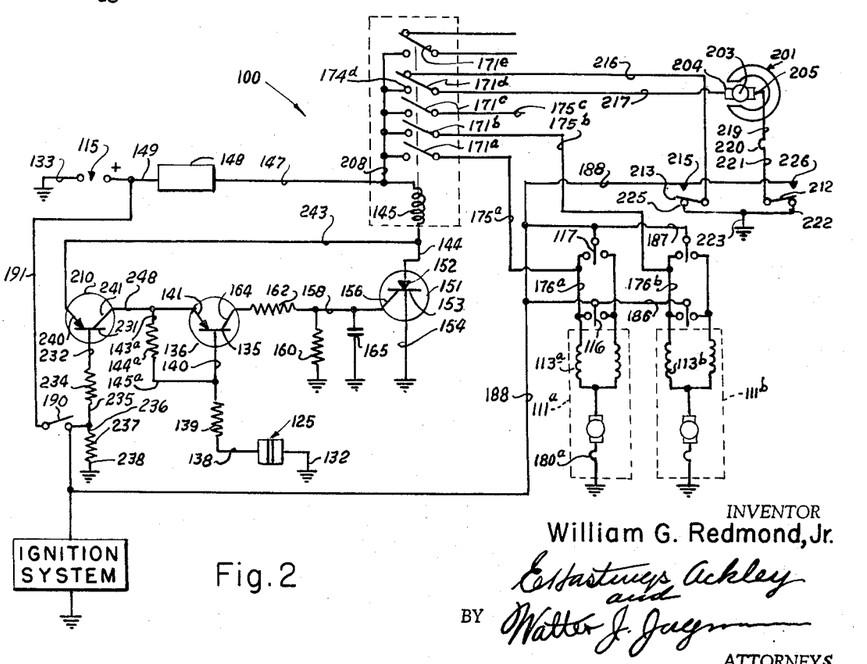
FIGURE 2 is a diagrammatic illustration of another control circuit for moving simultaneously the top and windows of a convertible automobile to closed positions upon the occurrence of precipitation.

Referring now to FIGURE 2 of the drawings the control circuit 100 embodying the invention is used to raise the window and top of a convertible upon the occurrence of precipitation.

Elements of the controlled circuit 100 common to the elements of the circuit 10 have been provided with the same reference numerals to which the prefix "1" has been added.

It is necessary to prevent operation of the top motor 111b when the automobile is in motion and accordingly the control circuit is provided with means to prevent operation of the rectifier 151 when the automobile is in motion. Preferably, this is accomplished by operation of the ignition switch and the provision of a transistor 210 which prevents the collector-emitter circuit of the transistor 136 from being rendered conductive when ever the ignition switch 190 is closed.

The motor 111a is shown as being used to move a window between its upper and closed positions and motor 111b is shown as used to move the top of the convertible between its closed and open positions. The automobile may also have one or more motors 201 for closing other windows of the automobile. Each motor 201 includes a permanent magnet 202 and an armature 203, the armature rotating in a direction to cause its window to be moved from its open to closed position when its terminal 204 is connected to the positive side of the input circuit 115 and its other terminal 205 is connected to ground and conversely rotating to move its window from its closed to its open position when its terminal 204 is connected to ground and its terminal 205 is connected to the positive side of the input circuit.

It will be apparent that the relay 146 is provided with as many movable contacts as the number of motors it must control.

The contacts 171a and 171b connect the windings 113 of window motors 111 to the positive side of the input circuit 115 when in their closed positions through the conductor 149, the timer switch 148, the conductors 147 and 208, the conductors 175a and 175b, and the conductors 176a and 176b, respectively. The switches 116 and 117 of each motor 111 connect one or the other of the windings 114 or 114 of the motor to the input circuit in a similar manner by means of the conductors 186, 187 and 188, the ignition switch 190 and the conductor 191.

Each of the motors 201, only one of which is shown, has a pair of switches 212 and 213 which control the direction of rotation of the armature 203 by reversing the flow of current therethrough. For example, if the window which is movable by the motor 201 is in its open position and it is desired to move it to its closed position, the switch 213 is moved to its upper position wherein it engages the stationary contact 215 and the motor terminal 204 is connected to the positive side of the input circuit by the conductors 149 and 191, the ignition switch 190, the conductors 188 and 216, the relay contact 171b, which is now in its upper position, and the conductor 217. The terminal 205 now remains connected to the other side of the input circuit through the conductor 219, the circuit breaker 220, the conductor 221, the switch 212, the conductors 222 and 223, ground and the conductor 133.

If it is desired to cause the motor to rotate in the opposite direction to move such window from its closed to its open position, the switch 213 is moved to its lower position where it engages its contact 225 and the switch 212 is moved to the position where it engages its upper contact 226. As a result, the terminal 205 is now connected to the positive side of the input circuit through the conductors 149 and 191, the ignition switch 190, and the conductors 188, 221 and 219 while its other terminal is connected to the other side of the input circuit through the conductor 217, the relay contact 171d, the conductor 216, the switch 213, the conductors 229 and 223, ground and the conductor 133. If the switches 213 and 212 are in their normal lower positions illustrated in the drawing and the relay winding 145 is energized, the relay contact 171d is moved to its lower position and the motor terminal 204 is connected to the positive side of the circuit through the conductor 217, the relay contact 171d which now engages its contact 174d, the conductors 208 and 147, the timer switch 148 and the conductor 149, while the other motor terminal 205 is connected to the ground through the switch 212 and ground as described above. Closing of the relay contact 171d and any other relay contact controlling a motor such as the motor 201, such as the relay contact 171e, will cause such motor to be so energized that it will move the window it operates from its open to its closed position if such window happens to be in open or partly open position.

The transistor 210 has its base 231 connected to ground through the conductor 232, a resistance 234, conductors 235 and 236, a resisance 237 and a conductor 238. The base is connectable to the positive side of the input circuit through the conductor 232, the resistance 234, the conductor 235, the ignition switch and the conductors 191 and 149.

When the ignition switch and the timer switch 148 are closed, the emitter 240 and the base 231 of the transistor 210 are substantially at the same positive voltage and the emitter-collector circuit of the transistor is held nonconductive. If the ignition switch 190 is open and the timer switch 148 is closed, its emitter 240 is at a higher positive voltage than its base 231 being connected to the positive side of the input circuit through the conductors 243 and 144, relay winding 145, the conductor 147, the timer switch and the conductor 149, and its base being connected to ground through the resistances 234 and 237. As a result, the collector-emitter circuit of the transistor 210 is conductive and the base and emitter of the transistor 136 are at substantially the positive side voltage of the input circuit as long as the sensor 125 is non-conductive, the emitter-collector circuit of the transistor 136 is non-conductive and will be rendered conductive when moisture falls on the sensor and causes its resistance to decrease. When the transistor 136 is rendered conductive, the rectifier 151 will be rendered conductive, the relay winding 145 will be energized and its contacts are moved to their closed positions. If the top is now down, closing of the relay contact 171b will cause the winding 113b of the motor 111b, which moves the top between its open and closed positions, to be connected to the positive side of the circuit and thus cause the motor 111b to move the top to its upper closed position. Simultaneously, the closure of the other relay contacts causes the motors controlled thereby to be energized as described above in such manner as to cause them to move their windows to their closed positions. The switch 148 is chosen so that it will open after a period of time after the energization of the rectifier 151 long enough to cause the top to move from its fully open to its fully closed position and also any window to move from its fully open to its fully closed position even though the top or any one or more of the windows may have been in its fully closed position at the time that the rectifier 151 was rendered conductive. The circuit breaker 180 associated with any of the motors will not open during such period of time during which the timer switch is closed even if the closure that it controls is initially in its fully closed position or is moved to its fully closed position before the switch 148 opens since the predetermined period of time is chosen to be sufficiently short that the timer switch 148 will open before any such circuit breaker.

It will now be apparent that the control circuit 100 unlike the control circuit 10 causes all of the current flowing through the top and window motors during the operation of the control circuit to flow through the timer switch 148 which, therefore, must have a higher capacity than the timer switch 48.

It will also be seen that the control circuit 100 is held inoperable whenever the ignition switch 190 is closed and thus prevents the raising of the top during the movement of the vehicle which, if it were traveling at a high speed, could cause damage to the top and could also cause the driver to lose control of the automobile.

If desired, the timer switch 148 could be connected in series with the relay winding and the movable contacts of the relay 146 could be connected directly to the positive side of the input circuit as in the case of the control circuit 10.

Figure 3:
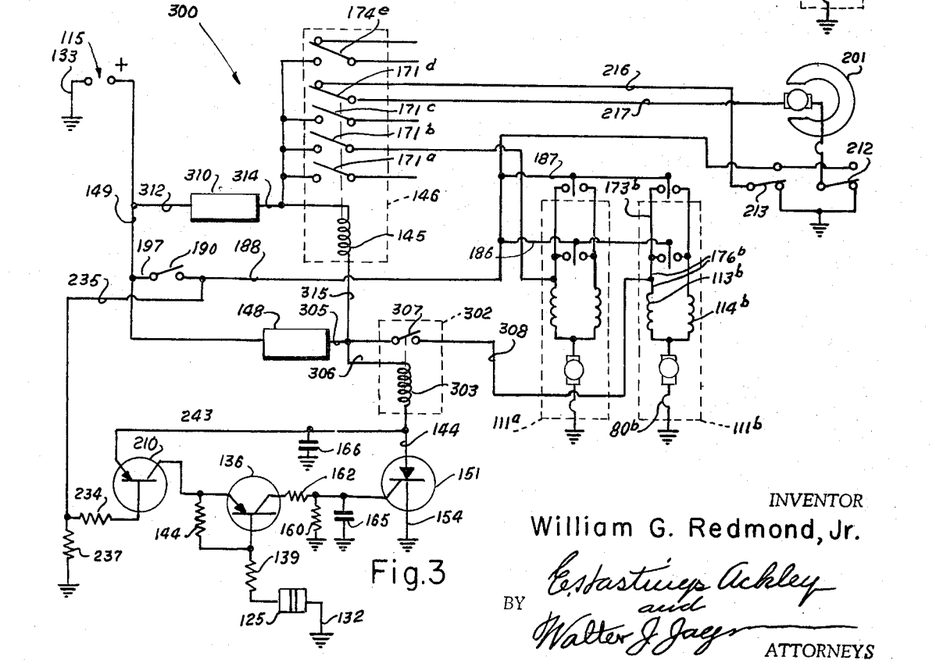
FIGURE 3 is a diagrammatic illustration of another control circuit for sequentially moving the top and then the windows of a convertible automobile to closed positions upon the occurrence of precipitation.

Referring now particularly to FIGURE 3 of the drawings, the control circuit 300 for raising the windows and top of a convertible automobile is similar to that of the circuit 100 and, accordingly, elements of the control circuit 300 common to the control circuit 100 have been provided with the same reference numerals as the corresponding elements of the control circuit 100. The control circuit 300 varies from the control circuit 100 in causing energization of first the top motor 111b to cause movement of the top of the convertible to its closed position, if it was in its open position, and then causes energization of the window motors to move any window which may have been in open position to its closed position.

The control circuit 300 includes a relay 302 whose winding 303 is connectable across the input circuit 115 in series with the anode-cathode circuit of the rectifier 151 through the conductor 149, the timer switch 148, the conductors 305, 306, 144 and 154, ground and the conductor 133. When the winding 303 is energized, one side of the winding 113b of the top motor 111b is connected to the positive side of the input circuit through the conductor 149, the timer switch 148, the conductor 305, the contact 307 of the relay 302 and the conductors 308 and 176b. It will thus be seen that if the rectifier 151 is conductive and the switch 148 is closed, current flows through the stator winding 113b of the top motor 111b and its armature and the top motor moves the top towards its closed position.

The winding 145 of the relay 146 is connectable in series with the relay winding 303 and the rectifier across the input circuit by a second timer switch 310 by means of the conductors 149, 312, 314, 315, 306, 144 and 154, ground and the conductor 133. It will be apparent that the relay winding 145 is connected across the two timer switches 148 and 310 so that both sides of the relay winding 145 are connected to the positive side of the input circuit when both of the switches 148 and 310 are closed so that the relay winding 145 will not have current flow therethrough when both timer switches are closed. If the voltage drop across the timer switch 148 is greater than across the timer switch 310 when both switches are closed, the amount of current flow through the relay winding 145 will be below that necessary to move its contacts to their closed positions.

The relay winding 303 requires a much higher current flow therethrough to maintain its contact 307 in its closed position than is necessary in the relay winding 145 to cause the contacts 171a-e to be moved to and held in their closed positions. When the timer switch 148 is open and the timer switch 310 is closed, the impedance of the windings 145 and 303 is sufficiently high to cause the current flowing through the two relay windings to be below the value necessary to cause the relay winding 303 to maintain its contact 307 in its closed position. As a result, if the relay winding 148 opens while the rectifier 151 is conductive and the switch 310 is still closed, the current flow in the winding 303 drops while the current flow in the winding 145 rises, the contact 307 is moved to its open position de-energizing the top motor 111b, the contacts 171 of the relay 146 are moved to their lower positions and connect the motor 111a, and any other motors, such as the motor 201, controlled by the contacts 171, across the input circuit, and the windows operable by these motors are moved to their closed positions. The time period of the switch 148 is sufficiently long that is permits the motor 111b to move the top of the automobile from its fully open to its fully closed position and similarly the period of the switch 310 is sufficiently long to permit any open window to be moved from its fully open to its fully closed position.

It will now be seen that by the provision of the two timer switches, sequential closing of the top and the windows is achieved, the top being first moved to its closed position and then the windows are moved thus preventing an excessive current drain on the battery of the automobile. Moreover, in some models of automobiles, it may be preferable or necessary that the top be in its closed position before the windows are moved to their fully closed positions.

It will be apparent that neither the top motor nor the window motor can be energized when the ignition switch 191 is in its closed position since the transistor 210 will then be non-conductive and will prevent the transistor 136 from being turned on even though the resistance of the sensor 125 decreases when moisture falls thereupon.

In addition, no current flow can take place through the sensor which could result in damage to the sensor due to electrolysis or erosion of the conductive strip if current flowed through the sensor device during prolonged periods of rain.

It will also be apparent that the control circuit 300 operates in a manner similar to that of the control circuit 100 but differs therefrom in causing sequential movement of the top if it is in its open position to its closed position and then any open windows of the automobile to their closed positions.

If the top is in its fully closed position at the time rain occurs, the current flow through the stalled top motor and the timer switch 148 is increased and the timer switch 148 will open a shorter period of time after the rectifier is rendered conductive and before the circuit breaker 80b opens and then the windows will be closed.

Figure 4:
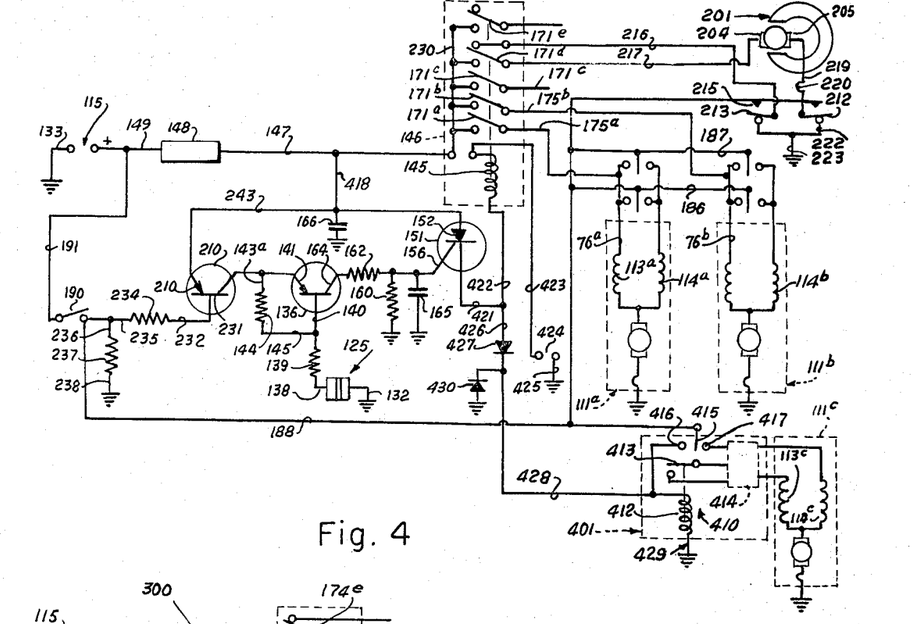
FIGURE 4 is a diagrammatic illustration of another control circuit for sequentially moving the top and windows of a convertible automobile to closed positions upon the occurrence of precipitation.

Referring now to FIGURE 4 of the drawings, the control circuit 400 is used to control the raising of the top and windows of an automobile, such as a model 1966 Lincoln Continental convertible which has a trunk in which the top is disposed when the top is in its open or down position and a lid or cover for the trunk which must be opened to permit the top to move into or from the trunk and which must be closed after the top has moved from or into the trunk. Such automobiles have a control circuit 401 for causing a trunk lid drive means to open and close the lid in proper sequence with the energization of a top motor 111c which moves the top between its open and closed positions. Such control circuit 401 of the automobile includes a relay 410 having a relay winding 412 which must be energized to cause its contact 413 to move to its closed position to cause operation of a sub-circuit 414 when it is desired to cause the convertible top to be moved to its upper closed position. The subcircuit 414 includes limit switches responsive to the movements of the trunk lid and the top to their fully opened and closed positions and causes, when the relay winding 412 is energized, the trunk lid to be moved to its open position, the top to be moved from its open position in the trunk to its closed position, and then the trunk lid to be moved to its closed position. The relay winding may be connected across the input circuit by a relay operator switch 415 which is accessible to the driver when the switch is moved to engage its contact 416. The switch when moved to its position wherein it engages its other stationary contact 417 causes the subcircuit 414 to control movement of the top from the closed to its open position by first causing the trunk lid to be moved to its open position, then causes the top to be moved into the trunk and then causes the trunk lid to again be moved to its closed position. The structure and mode of operation of such control circuit 401 being well known, it will not be described in greater detail herein.

The elements of the control circuit 400 identical to that of the control circuit 100 have been provided with the same reference numerals as the corresponding elements of the control circuit 100.

The motors 111a and 111b and one or more motors 201 are used to move the windows of the automobile and the motor 111c to move the top. The drive means for the trunk lid are not shown.

The relay winding 145 of the relay 146 is connectable across the input circuit 115 through the conductor 149, the timer switch 148, the conductors 147, 418 and 243, the anode-cathode circuit of the rectifier 151, the conductors 154, 421, 422 and 423, a switch 424 which is held in closed position by suitable mechanical means when the trunk lid is in its closed position, the conductor 425, ground and the conductor 133.

The relay winding 412 is energized when the timer switch 148 is closed and the rectifier 151 is conductive, through the conductor 149, the timer switch 148, the conductors 147, 418, 243, 421 and 426, a diode 427, the conductors 428 and 429, ground and the conductor 133. It is thus apparent that while the relay winding 145 can be energized only when the switch 424 is closed, the relay winding 412 will remain energized during the period of time during which the rectifier 151 is conductive. The diode 427 is provided to prevent undesired energization of the relay winding 149 when the switch 415 is actuated to energize the relay winding 412. The diode 430 connected across the winding 412 is provided to protect the rectifier from inductive voltage surges from the relay winding 412 which could cause the rectifier to be rendered conductive.

The operation of each motor 111 may be controlled in the usual manner by its associated switches 116 and 117 and the operation of each window motor 201 may be manually controlled by its switches 212 and 213. The operation of these window motors to cause them to move to their upper positions if, of course, controlled by the relay 146, the contact 171 causing energization of the motor 111a through its stator winding 113a and the contact 171b causing energization of the window motor 111b through its stator winding 113b. The contact 174c may be used to control another window motor such as the window motors 111a and 111b. The contact 171d controls the operation of the motor 201 and the contact 171e will control the operation of another window motor such as the window motor 201. It will be apparent, of course, that the relay 146 will have as many movable contacts as the number of window motors of the automobile used to move its windows between their open and closed positions.

In use, if the ignition switch 190 is closed, the control circuit 400 is in deactivated or inoperable condition as explained above, the transistor 210 now being held non-conductive and thus preventing the collector-emitter circuit of the transistor 136 from being rendered conductive even if the resistance of the sensor 125 is decreased as moisture falls thereupon.

If the ignition switch 190, however, is in open position, the timer switch 148 is closed, the top is in the trunk in its open position and the trunk lid is closed, the collector-emitter circuit of the transistor 210 is conductive although no current flows therethrough, except perhaps, some slight leakage currents, since the resistance of the sensor is extremely high or infinite. The rectifier 151 is, therefore, now non-conductive. If a drop of moisture falls on the sensor 125 and causes its resistance to decrease, the collector-emitter circuit of the transistor 136 is rendered conductive, a positive potential is applied to the gate 156 of the rectifier 151, the anode-cathode circuit of the rectifier is rendered conductive and current flows simultaneously through the relay windings 412 and 145 since the trunk lid switch 424 is now in its closed position. Energization of the relay winding 412 now causes the trunk lid to begin to move to its open position and the energization of the relay winding 145 causes the window motors to move any window in open position toward its closed position. As such windows are moved to partly closed positions and as the trunk lid moves toward open position, the trunk switch 424 is opened and the winding 145 is disconnected from across the input circuit 115 de-energizing the window motors and thus arresting movement of the windows toward their closed positions. The relay winding 412 and the rectifier remain connected in series across the input circuit through the closed timer switch, and the relay winding 412 remains energized. When the trunk lid moves to its fully opened position, the sub-circuit 414 causes the motor 111c which controls operation of the top to be connected across the input circuit through its stator winding 113c and the motor 111c moves the top from its open position in the trunk to its fully closed position. At this time, the motor 111c is de-energized by the sub-circuit 414 and the trunk lid drive means is energized to move the trunk lid back to its closed position. As the trunk lid moves to its closed position, the switch 424 is again closed, the relay winding 145 is again energized and any windows which are now in their partly closed positions are moved by the window motors to their fully closed positions. The period of the timer switch 148 is sufficiently long after the initiation of flow therethrough when the rectifier 151 is rendered conductive, that any window which was in its fully open position at the initiation of operation of the control circuit is moved to its fully closed position before the timer switch 148 opens. The current flowing through the timer switch when the rectifier is conductive the trunk lid switch 424 is open is very low since the relay winding draws only a low current and does not appreciably affect the time period of the timer switch 148. When the timer switch opens, the anode of the rectifier and the emitter of the transistor 210 are disconnected from the positive side of the input circuit and the rectifier and the transistors are rendered non-conductive. As a result, the control circuit now is completely inoperable and can be rendered operable only if the switch 148 is moved back manually to its closed position.

It will be apparent that the control circuits 100, 300 and 400 cause no appreciable drain of current from the battery of the automobile when their timer switches are closed and their sensor devices thereof are non-conductive or have a great resistance as in the case when there is no moisture present on their upper surfaces since the only current flow is through the emitter base circuit of the transistor 210 which is very small, that the control circuits are rendered operable only when the moisture falls upon the sensors, and that upon the completion of the movement of the closures, such as the top or windows of an automobile to their fully closed positions, the control circuits are again disconnected from the input circuit and thereafter cause no current drain on the battery of the automobile.

It will also be apparent that any time the operation of such control circuit is initiated by the deposition of moisture on its sensor, the full sequence of operation of the control circuit is carried out and any open closure of the automobile is moved to its fully closed position.

Figures 5, 7:
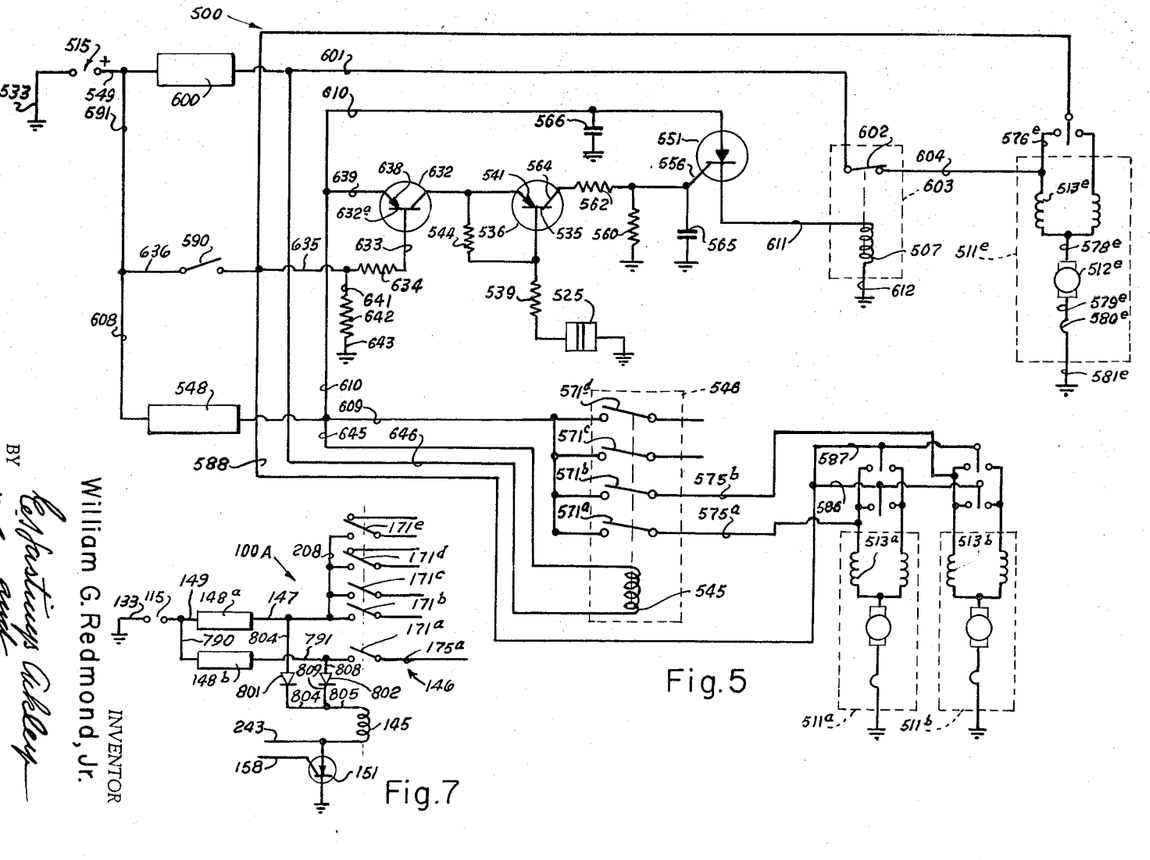

Referring now to FIGURE 5 of the drawings, the control circuit 500 is used to cause a top motor 511e to move the top of a convertible automobile from its open to its closed position and then cause the window motors 511a, 511b . . . 511n which move individual windows of the automobile between their open and closed positions to move any window which is in open or partly open position to its closed position.

Elements of the circuit 500 common to the circuit 10 have been provided with the same reference numerals, to which the prefix "5" has been added, as the corresponding elements of the control circuit 10. The motor 511e is connectable across the input circuit through its stator winding 513e, which when energized causes its armature to rotate in such direction as to move the top towards its closed position, by means of the conductor 549, a top timer switch 600, the conductor 601, the movable contact 602, of a top relay 603, the conductor 604, the stator winding 513e, the conductor 578e, the armature 512e, the conductor 579e, the circuit breaker 580e, the conductor 581e, ground and the conductor 533. The contact 602 is moved to its closed position when its relay winding 607 is connected across the input circuit 515 by means of the conductors 549, 591, 608, the window timer switch 548, the conductors 609 and 610, the anode-cathode circuit of the rectifier 551, the conductors 611 and 612, ground, and the conductor 533. The rectifier 551 can be rendered conductive only if the ignition switch 590 is in its open position since the emitter-collector circuit of a transistor 632 can be rendered conductive only if the ignition switch is open because when the ignition switch is closed, its base 632a is connected to the positive side of the input circuit through the conductor 633, a resistance 634 and the conductors 635, 636 and 591 and 549, and its emitter 638 is also connected to the positive side of the input circuit through the conductors 639, 610 and 609, the closed window timer switch 548 and the conductors 608, 591 and 549. The base is also connected to ground through the conductor 633, the resistance 634, the conductors 635 and 641, the resistance 642, the conductor 643, ground and the conductor 533, so that when the ignition switch is open and the window timer switch 548 is closed, the base is at a lower voltage than the emitter and its collector-emitter circuit is in condition to conduct. The transistor 632 controls operation of the transistor 536 which can be rendered conductive only if the emitter-collector circuit of the transistor 632 is in conductive state and the resistance of the sensor 525 is decreased by the presence of moisture thereon.

It will thus be apparent that when the ignition switch is open and the timer switches 548 and 600 are closed, if the resistance of the sensor 525 decreases due to the deposition of moisture thereon, the collector-emitter circuit of the transistor 536 is rendered conductive and a positive potential is applied to the gate 556 of the rectifier 551 and it is rendered conductive thus causing the relay winding 607 to be energized. The contact 602 is thus moved to closed position and causes energization of the top motor 511e.

The relay winding 545 of the window relay 546 is connected across the input circuit 515 and causes its contacts 571 to move to closed positions when the top timer switch 600 is open, the window timer switch 548 is closed, and the rectifier 551 is conductive through the conductors 549, 591 and 608, the timer switch 548, the conductors 609, 645, 646 and 601, the relay contact 602, the conductor 604, the motor through its winding 513e and armature, the circuit breaker 580e, ground and the conductor 533. The resistance of the motor when it is in its stalled condition is decreased and will cause sufficient current flow through the window relay winding 545 to cause its contacts 571 to be moved to their lower closed positions but since the impedance of the window relay winding 545 is now in series with the motor, sufficient current will not flow through the circuit breaker 580e to cause it to open and the relay winding 545 will remain energized until the timer switch 548 opens.

When both timer switches 548 and 600 are in closed positions, both sides of the relay winding 545 are connected to the positive side of the input circuit 515 and very little if any current flows through the relay winding 545. One side of the winding 545 is then connected to the positive side of the input circuit through the conductors 645 and 609, the window timer switch 548, and the conductors 608, 591 and 549, and the other side of the winding is connected to the positive side of the input circuit through the conductors 646 and 601, the top timer switch 600, and the conductor 549.

In use, if the ignition switch 590 is in its closed position, the control circuit 500 is inoperable or deactivated and will not cause energization of either the top motor or of the window motors even if moisture falls on the sensor 505. If the ignition switch is open and the window and top timer switches are closed, the collector-emitter circuit of the transistor 632 is in a conductive state, even though it is not conducting any current therethrough since the resistance of the sensor 525 is now very great or infinite and the collector-emitter circuit of the transistor 536 is non-conductive because its base and emitter are both at substantially the positive voltage of the input circuit 515.

If a drop of moisture now falls upon the sensor 525 decreasing its resistance, the base 535 of the transistor 536 goes negative relative to its emitter 541, the collector-emitter circuit of the transistor 536 is rendered conductive and a positive potential is applied to the gate 556 of the rectifier causing its anode-cathode circuit to be rendered conductive. The rectifier will now remain conductive until its anode voltage is removed when the window timer switch 548 opens.

When the rectifier is rendered conductive, the relay contact 602 is moved to its closed position and the motor 511e is energized in such a manner that it moves the automobile top from its open to its closed position. During the time the top is being raised and the top timer switch is closed, little or no current flow is taking place through the window relay winding 548 and its contacts remain in their open positions. The top timer switch 600 remains closed for a period of time, after the closing of the contact 602, sufficiently long to permit the top of the automobile to be moved from its fully open to its fully closed position. After this period of time has elapsed and the top is in its fully closed position, the timer switch 600 opens and thereafter remains open until it is again manually closed. Opening of the timer switch 600 causes sufficient flow of current through the window relay winding 545 and it moves its contacts to their fully closed position, one side of the window relay winding then being connected to the positive side of the input circuit through the closed timer switch 548, and its other side being connected to the other side of the input circuit through the relay contact 602 and the motor 511e which is now in its stalled condition since the top is in its fully closed position. The current flowing through the motor, as was explained above, is relatively low and will not cause the circuit breaker 580e to open.

Closure of the relay contacts 571 of the window relay 546 now causes the window motors 511 controlled thereby to be energized through their stator windings 513 and the motors move their associated windows to their fully closed position. The timer switch 548 will now remain closed after the initiation of conduction therethrough, which occurs when the transistor 536 and rectifier are rendered conductive, for a period of time sufficiently long that the top will be moved from its fully open position to its fully closed position and any window in its fully open position will be moved to its fully closed position. It will be apparent that the current flowing through the window timer switch increases when current begins to flow through the winding 545 and the window motors so that the time period of the timer switch is principally dependent on the value of the current flowing therethrough after the top timer switch opens. The timer switch 548 opens after all windows are in their fully closed positions and the circuit 500 is then fully and completely disconnected from across the input circuit 515 and can be reactivated or placed in operative condition only by again closing the top and window timer switches while leaving the ignition 590 open.

It will be seen that the timer switches of the described and illustrated control circuits draw current from the input circuit only after moisture falls upon the sensors of the circuits and then only until the closures of the automobile have all been moved to their fully closed positions.

It will further be seen that each of the control circuits, as in the case of the control circuit 10, includes a precipitation sensing means or circuit, such as the circuit which includes the sensor 25 and the transistor 36, which causes a control means such as the silicon controlled rectifier 51, to be rendered conductive and that such control means remains conductive or energized until it is disconnected by a timer means, such as the timer switch 48, from across an input circuit, and a switching means, such as the relay 46, which is operable in response to the energization of the control means for connecting drive means of closures, such as those of the windows of automobiles or the top of an automobile, across an input circuit to cause them to move such closures from their open to their closed positions, and that the timer means de-energizes the control circuit a period of time after the energization of the control means sufficiently long to permit any of the closures to be moved from its fully open to its fully closed position.

It will further be seen that the control circuit, such as the control circuit 100 may include deactivating means, such as the circuit which includes the transistor 210, for deactivating or preventing operation of the sensing means as long as the ignition switch of the motor of the automobile is closed in order to prevent the closing of the top of an automobile during travel of the automobile.

It will further be seen such control circuit, as in the case of the control circuits 300, 400 and 500, may include means for causing sequential energization of the drive means of different closures, where sequential movements of such closures to their closed positions is required due to their physical interrelationship which require that one be in closed position before the other moves to its closed position or to prevent the drawing of excessive load currents from the input circuit.

It will be seen that the control circuits 300 and 500 which have means for sequentially causing energization of the drive means of a plurality of closures may be used to first close one window or group of windows and then close another window or group of windows. For example, in the case of the control circuit 300, the motor 114b whose operation is controlled by the relay 302 could be employed to move a window from its open to its closed position instead of to move the top of a convertible automobile.

Figure 6:
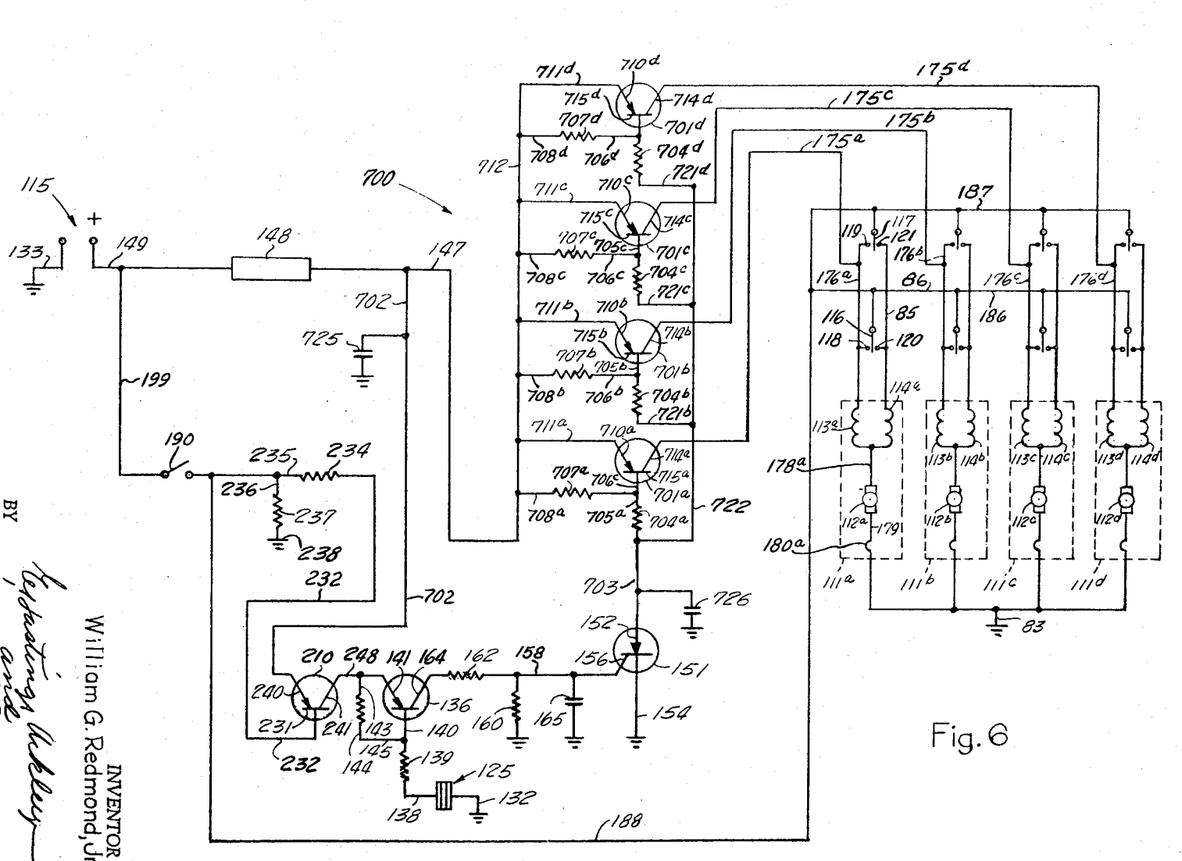

While the silicon controlled rectifiers of the above described circuits are shown as causing operation of relays which act as switch means for connecting the drive means or motors of movable closures across an input circuit, the rectifiers could be used, as in the case of control circuits 700 illustrated in FIGURE 6, to cause operation of semiconductors such as the power transistors 701a–d which act as switch means for connecting the motors 111a–d, respectively, across the input circuit 115. The control circuit 700 is similar in other respects to the control circuit 100 and elements of the circuit 700 common to the circuit 100 have been provided with the same reference numerals as the corresponding elements of the control circuit 100.

The emitter 240 of the transistor 210 of the control circuit 700 is connectable to the positive side of the input circuit 115 by the conductors 702 and 147, the timer switch 148 and the conductor 149 while the anode 152 of the rectifier 151 is connectable to the positive side of the input circuit through the conductor 703, a resistance 704a, the conductors 705a and 706a, a resistance 707a, the conductors 708a and 147, the timer switch 148 and the conductor 149. The emitters 710a–d of the power transistors 701a–d are connectable to the positive side of the input circuit through the conductors 711a–d, the conductors 712 and 147, the timer switch 148 and the conductor 149 while their collectors 714a–d are connected to the stator windings 113a–d, respectively, of the motors 111a–d by the conductors 175a–d and 176a–d, respectively.

The bases 715a–d of the power transistors 701a–d are connectable to the positive side of the input circuit through the resistances 707a–d and to the other side of the input circuit through the resistances 704a–d, respectively, and the anode-cathode circuit of the rectifier 151. The bases of the transistors 701b, 701c and 701d are connectable to the positive side of the input circuit through the conductors 706b–d, the resistances 707b–d and the conductors 708b–d, respectively, the conductors 712 and 147, the inner switch 148 and the conductor 149. The bases of the power transistors 701b–d are connected to the anode of the rectifier through the conductors 705b–d, the resistances 704b–d, and the conductors 721b–d, respectively, and the conductors 722 and 703. Capacitors 725 and 726 are connected between ground and the emitter of the transistor 210 and the anode of the rectifier 151, respectively, to prevent transient voltages from causing conduction of the rectifier 151.

In use, when the ignition switch 191 is closed, the collector-emitter circuit of the transistor 210 is held in its non-conductive condition and, therefore, the emitter collector circuit of the transistor 136 is also non-conductive. The rectifier is non-onductive and the collector-emitter circuits of the power transistors are also non-conductive since their bases and emitters are now all at substantially the positive voltage of the positive side of the input circuit.

If the ignition switch is open, the emitter-collector circuit of the transistor 210 is in its conductive condition although not conducting since the sensor 125 now provides an infinite resistance to flow of current therethrough and the base and emitter of the transistor 136 are held at substantially the voltage of the positive side of the input circuit. If a drop of rain now falls on the sensor 125, the base of the transistor 136 goes negative relative to its emitter and its emitter-collector circuit becomes conductive causing a positive voltage to be applied to the gate 156 of the rectifier 151 and the rectifier 151 is rendered conductive. The voltage at the bases of the transistors 701, therefore, goes negative relative to the voltage at their emitters and the collector emitter circuits of the power transistors are then rendered conductive and connect the motors 111a–d across the input circuit through their stator windings 113a–d. The timer switch 148 will now remain closed for a period of time sufficiently long to cause any one of the closures, such as a window or a top movable between its open and closed positions by one of the motors 111a–d, to move to its fully closed position. At the end of this period of time, the timer switch 148 will open removing the positive voltage from the emitter of the transistor 210, the anode of the rectifier 151, and the emitters of the power transistors. The control circuit 700 may then again be rendered operative only upon the subsequent reclosure of the switch 148.

It will now be seen that each of the illustrated and described control circuits embodying the invention provides for the movement to closed positions of a closure, such as a window or top of an automobile or a window, vent or the like of a building by a suitable drive means upon the occurrence of precipitation.

In FIGURE 7 is illustrated a modified form of the control circuit 100, and accordingly, elements of the control circuit 100a common with elements of the circuit 100 have been provided with the same reference numerals as the corresponding elements of the circuit 100.

The control circuit 100a differs from the control circuit 100 in having a second timer switch 148b for controlling operation of one of the motors, for example, the motor 111a, which may be used, for example, to move the top of a convertible automobile from its open to its closed position, in order to prevent current flow through such top motor when the top has been moved to its fully closed position if the top happens to be in closed position at the time of the occurrence of precipitation and also to prevent current flow through the window motors if the windows move to their closed positions before the top moves its closed position or if the windows are in their closed positions and the top is in its open position when precipitation starts.

The timer switch 148b is connected in series with the contact 171a of the relay 146, when it is in closed position, between the positive side of the input circuit and the conductor 175a which is, of course, connected to one side of the stator winding of such top motor, such as the stator winding 113a of the motor 111 by the conductors 149, 790 and 791. The other contacts 171b–e of the relay 146, when in closed position are connected to the positive side of the input circuit through the timer switch 148 in the same manner as in the control circuit 100. The control circuit 100a includes a pair of diodes 801 and 802 to prevent current flow from the positive side of the input circuit to the conductor 791 when the timer switch 148b is open and the timer switch 148 is closed and to prevent current flow from the positive side of the input circuit to the conductor 147 when the timer switch 148 is open and the switch 148b is closed. The diode 801 is connected between the conductor 147 and the relay winding 145 by the conductors 803, 804 and 805 and the diode 802 is connected between the conductor 791 and the relay winding by the conductors 808, 809 and 805.

It will be apparent that for the top motor to be energized, the rectifier 151 must be conductive and the timer switch 148b must be closed and, similarly, for the window motors controlled by the contacts 171d–e to be energized, the rectifier 151 must be conductive and the timer switch 148 closed.

In use, if both timer switches 148 are in their closed positions and the rectifier 151 is rendered conductive upon the occurrence of precipitation, all contacts of the relay winding are moved to their closed positions and are held closed until both timer switches open. The relay winding 141 is then connected across the input circuit through the rectifier 151 and the diode 801 and the timer switch 148a and also through the diode 802 and the timer switch 148b. All of the drive means will now be energized simultaneously and any in open or partly open positions will be moved to their closed positions. If the top movable by the motor 111a controlled by the contact 171a reaches its closed position before any open windows are moved to their closed positions, the increased flow of current through the switch 148b due to the stalled condition of the top motor will shorten the predetermined period of the timer switch 148b and it will open and thus prevent any further flow of current through the motor 111a which will thus be disconnected from the input circuit.

Conversely, if at the time of occurrence of precipitation the windows of the convertible automobile are in their closed positions but the top is in its open position, the motors controlled by the contact 171b–e will be in their stalled conditions causing a relatively high current flow through the timer switch 148a when the relay winding is energized so that it will open in a period of time much shorter than if one or more of the windows were initially in open position.

It will be apparent that the control circuit 100a prevents excessive current drain from the battery of the automobile when the windows or the top are in their fully closed positions and also insure that the voltage available for the drive means of closures which are still open will not be excessively lowered due to the relatively high voltage drop across the stalled motors of closures in closed positions.

It will further be seen that each control circuit will operate for a predetermined period of time after initiation of its operation to insure that such closure is moved to a closed position even if the precipitation is relatively scattered and the drops of precipitation fall on the sensor at intervals sufficiently long that each drop of moisture on the sensor may evaporate before the next one falls upon the sensor and time required for its evaporation is shorter than the period of time necessary to move the closure from its fully open to its fully closed position. As a result, the control circuit does not operate intermittently under such conditions and insures that the closures are moved to their closed positions if even only a single drop of precipitation falls upon the sensor 125.

Each of the illustrated and described control circuits will function properly to move any open closure to its fully closed position even though one or more of the other closures are in fully or partly closed positions at the time of initiation of operation of the control circuits, the time period of the timer switch being sufficiently long to ensure movement of any closure from ts fully open to its fully closed positions.

It will now be seen that a new and improved control circuit has been illustrated and described which requires the use of only a single relay as in the case of the control circuits 10, 100 and 700 where simultaneous operation of all drive means of all closures is feasible and that where sequential operation of the drive means of certain of the closures is required or desired, as in the case of the control circuits 300 and 500, only two relays are employed.

It will further be seen that the operation of such relays or switch means is controlled by a rectifier which is rendered conductive upon the occurrence of precipitation and which remains conductive until a timer means, such as a timer switch disconnects the rectifier from across an input circuit after a period of time sufficiently long after the initiation of its conduction to cause any closure in its fully open position to be moved to its fully closed position.

The foregoing description of the invention is explanatory only and changes in the details of the construction illustrated may be made by those skilled in the art, within the scope of the appended claims, without departing from the spirit of the invention.

What is claimed and desired to be secured by Letters Patent is:

1. A control circuit for a closure movable between open and closed position by an electrically operable drive means, said control circuit including: a direct current input circuit; a sensing circuit connected across said input circuit and including an exposed sensor device whose resistance decreases upon the occurrence of precipitation; a normally non-conductive control means connected across said input circuit; said sensing circuit being operatively associated with said control means and providing a signal to said control means for rendering said control means conductive when the resistance of said sensor device is decreased; switch means operable by said control means when said control means is conductive for connecting the drive means across said input circuit; and timer means operatively associated with said sensing circuit and said control means for disconnecting said sensing circuit, said control means and said timer means from across said input circuit a predetermined period of time after said control means has been rendered conductive.

2. The control circuit of claim 1, wherein said timer means comprises a switch and wherein said switch means comprises a relay having a winding connected in series with said switch and said control means across said input circuit when said timer means is closed and said control means is conductive.

3. The control circuit of claim 2, wherein said relay includes a contact movable to closed position when said winding is energized to connect the drive means across said input circuit.

4. The control circuit of claim 3, wherein said contact connects the drive means in series with said switch across said input circuit when said contact is in closed position.

5. The control circuit of claim 2, wherein said control means comprises a controlled rectifier having a control member and said sensing circuit provides a voltage to said control member to initiate conduction of said rectifier when the resistance of said sensor device decreases upon the occurrence of precipitation.

6. The control circuit of claim 5, wherein said sensing circuit includes a transistor having a base and a collector-emitter circuit connected across said input circuit in series with said switch, means operatively associated with said base and said sensor device causing said collector-emitter circuit to be rendered conductive when the resistance of said sensor device decreases, and means operatively associated with said control member and said collector-emitter circuit for transmitting a voltage to said control member to render said controlled rectifier conductive when said collector-emitter circuit is rendered conductive.

7. The control circuit of claim 6; and switch means operatively associated with said transistor for preventing the collector-emitter circuit of said transistor from being rendered conductive when said switch is closed.

8. A control circuit for a plurality of closure drive means, each being adapted to move an associated closure from its open to its closed position, said control circuit including: a direct current input circuit; a moisture sensing circuit connected across said input circuit and including a sensor device whose resistance decreases upon the occurrence of precipitation; a normally non-conductive control means connected across said input circuit, said control means once rendered conductive remaining conductive until disconnection from across such input circuit, said sensing circuit being operatively associated with said control means and providing a signal to said control means for rendering said control means conductive when the resistance of said sensor device is decreased; switch means operable by said control means when said control means is conductive for connecting the drive means of the closures across said input circuit; and a first timer means operatively associated with said sensing circuit and said control means for disconnecting said control means, said sensing circuit and said first timer means from across said input circuit a predetermined period of time after said control means has been rendered conductive, said predetermined period being sufficiently long to permit the drive means of any of the closures to move its associated closure from its fully open position to its fully closed position.

9. The control circuit of claim 8, wherein said timer means includes a first switch and said switch means comprises a relay having a winding connected in series with said first switch and said control means across said input circuit.

10. The control circuit of claim 9, wherein said relay includes a plurality of contacts each movable to closed position when said winding is energized for connecting its associated drive means across said input circuit.

11. The control circuit of claim 10, wherein said contacts connect each of the drive means in series with said first switch across said input circuit when said contacts are in closed positions, said predetermined period of time varying in accordance with the current flowing through said first switch.

12. The control circuit of claim 11, wherein said control means comprises a controlled rectifier having a control member and said sensing circuit provides a voltage to said control member to initiate conduction of said rectifier when the resistance of said sensor device decreases upon the occurrence of precipitation.

13. The control circuit of claim 12, wherein said sensing circuit includes a transistor having a collector-emitter circuit connected in series with said switch across said input circuit and a base, means operatively associated with said base and said sensor device for causing said collector-emitter circuit to be rendered conductive when the resistance of said sensor device decreases, and means operatively associated with said control member and said collector-emitter circuit for transmitting a voltage to said control member to render said control rectifier conductive when said collector-emitter circuit is rendered conductive.

14. The control circuit of claim 13, wherein said closures are on a vehicle having an ignition switch which must be closed to permit travel of the vehicle and wherein said control circuit has means operatively associated with said ignition and said transistor for preventing said collector-emitter circuit from being rendered conductive when said ignition switch is closed.

15. The control circuit of claim 8, wherein said switch means includes a plurality of individual means each for connecting an associated one of the drive means across said input circuit.

16. The control circuit of claim 15, wherein said first timer means connects at least one of said individual means to said input circuit.

17. The control circuit of claim 16, and second timer means for connecting another one of said individual means to said input circuit, said second timer means disconnecting said another one of said individual means from said input circuit a predetermined period of time after said control means has been rendered conductive.

18. The control circuit of claim 17, wherein said first and second timer means each comprise a switch for connecting said individual means simultaneously across said input circuit when said control means is rendered conductive, and wherein the predetermined period of time of each timer means is shortened when the drive means connected across said input circuit by the timer means and its associated individual means is in stalled condition through its closure in closed position, said switches of each of said timer means opening after the end of said predetermined period thereof.

19. The control circuit of claim 18, wherein said switch means comprises a relay having a winding connectable in series with said control means across said input circuit through each of said timer means and said individual means comprise contacts movable to closed positions when said control means is conductive and said switch of at least one of said timer means is closed.

20. The control circuit of claim 19, and means for preventing contacts connectable by one of said timer means from conducting current flowing through the other of said timer means.

21. The control circuit of claim 8, wherein said switch means includes a first relay having a first winding and at least one contact and a second relay having a second winding and at least one contact, said first timer means when closed connecting one of the drive means in series with said contact of said first relay across said input circuit when said first winding is energized; a second timer means for connecting another of the drive means in series with said contact of said second relay across said input circuit when said second winding is energized; said second timer means disconnecting said another of said drive means from across said input circuit a predetermined period of time after said control means has been rendered conductive; and means operatively associated with said relays and said first timer means for causing said first winding to be energized to move its contact to connect said one of said drive means in series with said first timer means across said input circuit when said second timer means disconnects said another of said drive means at the end of said predetermined period of time.

22. The control circuit of claim 21, wherein said first winding is connected in series with said first timer means and said control means is connected in series with said second timer means and said control means when said first and second timer means are in closed positions and wherein said first and second relay windings are connected in series with said first timer means when said second timer means is open.

23. The control circuit of claim 20, wherein said switch means includes a first relay having a first winding connected across said input circuit circuit in series with said first timer means and energized by current flowing through said first timer means when both timer means are closed, a second relay means having a second winding connected in series with said second timer means, said first winding and said control means across said control means across said input circuit and energized by current flowing through said second timer means is open, one of said drive means being energized by current flowing through said second timer means when the second relay winding is energized and another drive means being energized by current flowing through said first timer means when said first winding is energized.

24. The control circuit of claim 8, wherein said closure is a window of an automobile having a convertible top and circuit for controlling sequential movement of the top and a trunk lid of the automobile which includes a control relay winding, said control circuit including: a switch held in closed position when said trunk lid is in closed position, said switch when in open position disconnecting said switch means from said input circuit; and means operatively associated with said control means for causing said control relay to be connected across said input circuit when said control means is conductive.

25. The control circuit of claim 8, wherein said switch means comprises controlled semi-conductive devices.

26. The control circuit of claim 1, wherein said timer means is responsive to the current flowing through the drive means for varying the length of said predetermined period of time inversely in accordance with the current.

27. The control circuit of claim 1, wherein said timer means includes a switch for connecting the drive means across said input circuit, said timer means being responsive to the current through said switch and the drive means for varying the length of said predetermined period of time inversely in accordance with the current.

References Cited

UNITED STATES PATENTS

| | | | |
|---|---|---|---|
| 2,617,972 | 11/1952 | Nutter | 318—483 |
| 2,640,958 | 6/1953 | Davis | 318—483 |
| 2,731,588 | 1/1956 | McLeod | 318—483 |
| 2,754,460 | 7/1956 | Goldman | 318—483 |
| 2,823,346 | 2/1958 | Weber | 318—483 |
| 2,994,525 | 8/1961 | Onksen et al. | 318—483 |

OTHER REFERENCES

G.E. Silicon Controlled Rectifier Manual, second edition, Dec. 29, 1961, page ii.

ORIS L. RADER, *Primary Examiner.*

B. A. COOPER, *Assistant Examiner.*

UNITED STATES PATENT OFFICE
CERTIFICATE OF CORRECTION

Patent No. 3,386,022  
May 28, 1968

William G. Redmond, Jr.

It is certified that error appears in the above identified patent and that said Letters Patent are hereby corrected as shown below:

Column 6, line 13, "windings 114 or 114" should read -- windings 113 or 114 --; line 63, "resisance" should read -- resistance --. Column 14, line 66, "non-onductive" should read -- non-conductive --. Column 18, line 51, after "ignition" insert -- switch --. Column 19, line 45, cancel "circuit", second occurrence.

Signed and sealed this 30th day of December 1969.

(SEAL)  
Attest:

Edward M. Fletcher, Jr.  
Attesting Officer

WILLIAM E. SCHUYLER, JR.  
Commissioner of Patents